United States Patent
Liebald et al.

(10) Patent No.: US 8,589,434 B2
(45) Date of Patent: Nov. 19, 2013

(54) RECOMMENDATIONS BASED ON TOPIC CLUSTERS

(75) Inventors: Benjamin Liebald, San Francisco, CA (US); Palash Nandy, Paris (FR); Dasarathi Sampath, San Bruno, CA (US); Junning Liu, Milbrae, CA (US); Ye Niu, San Bruno, CA (US); Christina Ilvento, San Francisco, CA (US); Yu-To Chen, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/309,481

(22) Filed: Dec. 1, 2011

(65) Prior Publication Data

US 2012/0143911 A1 Jun. 7, 2012

Related U.S. Application Data

(60) Provisional application No. 61/418,818, filed on Dec. 1, 2010.

(51) Int. Cl.
*G06F 17/30* (2006.01)

(52) U.S. Cl.
USPC ............... 707/771; 707/733; 707/708

(58) Field of Classification Search
USPC ................. 707/733, 734, 736, 737, 771, 708
See application file for complete search history.

(56) References Cited

U.S. PATENT DOCUMENTS

| | | | |
|---|---|---|---|
| 6,078,866 A | 6/2000 | Buck et al. | |
| 6,442,606 B1 | 8/2002 | Subbaroyan et al. | |
| 6,513,039 B1 | 1/2003 | Kraenzel | |
| 7,016,939 B1 | 3/2006 | Rothwell et al. | |
| 7,124,149 B2 | 10/2006 | Smith et al. | |
| 7,313,621 B2 | 12/2007 | Gudorf et al. | |
| 7,392,262 B1 | 6/2008 | Alspector et al. | |
| 7,596,591 B2 * | 9/2009 | Titmuss | 709/224 |
| 7,624,274 B1 | 11/2009 | Alspector et al. | |
| 7,644,127 B2 | 1/2010 | Yu | |
| 7,707,167 B2 | 4/2010 | Kishore et al. | |
| 7,813,954 B1 * | 10/2010 | Price et al. | 705/14.1 |
| 7,970,762 B2 * | 6/2011 | Goronzy et al. | 707/732 |
| 8,019,777 B2 * | 9/2011 | Hauser | 707/769 |

(Continued)

FOREIGN PATENT DOCUMENTS

KR 10-2009-0013155 A 2/2009

OTHER PUBLICATIONS

PCT International Search Report and Written Opinion, PCT Application No. PCT/US2011/062965, Jul. 27, 2012, 8 pages.

(Continued)

*Primary Examiner* — Thanh-Ha Dang
(74) *Attorney, Agent, or Firm* — Fenwick & West LLP

(57) ABSTRACT

A system and method for developing a user's profile based on the user's interaction with content items. A module on the client rendering the content items or the service including the content items tracks the user's interactions with the content items and transmits the tracked data to a user analysis module. The user analysis module determines the topics associated with the interacted upon content items. The user analysis module then selects the topics for the user's profiles based on the received tracked data and the associated topics. The selected topics are mapped to topic clusters and the topic clusters are stored in association with the user profile. Recommendations for a user are made based on the topic clusters associated with the user' profile.

16 Claims, 6 Drawing Sheets

(56) References Cited

U.S. PATENT DOCUMENTS

| | | | |
|---|---|---|---|
| 8,037,095 B2* | 10/2011 | Haileselassie et al. | 707/784 |
| 8,161,044 B2* | 4/2012 | Blackwell et al. | 707/731 |
| 8,171,032 B2* | 5/2012 | Herz | 707/748 |
| 8,180,776 B2* | 5/2012 | Haveliwala et al. | 707/738 |
| 8,306,975 B1 | 11/2012 | Eldering | |
| 2002/0015056 A1 | 2/2002 | Weinlaender | |
| 2002/0055936 A1 | 5/2002 | Cheng et al. | |
| 2003/0037041 A1* | 2/2003 | Hertz | 707/1 |
| 2003/0093794 A1 | 5/2003 | Thomas et al. | |
| 2003/0154180 A1* | 8/2003 | Case et al. | 707/1 |
| 2003/0170006 A1 | 9/2003 | Bogda et al. | |
| 2004/0059705 A1 | 3/2004 | Wittke et al. | |
| 2004/0098386 A1* | 5/2004 | Thint et al. | 707/3 |
| 2004/0098469 A1* | 5/2004 | Kindo et al. | 709/219 |
| 2004/0148330 A1 | 7/2004 | Alspector et al. | |
| 2005/0060643 A1 | 3/2005 | Glass et al. | |
| 2005/0071741 A1 | 3/2005 | Acharya et al. | |
| 2005/0188023 A1 | 8/2005 | Doan et al. | |
| 2005/0216434 A1* | 9/2005 | Haveliwala et al. | 707/1 |
| 2006/0161553 A1 | 7/2006 | Woo | |
| 2006/0161952 A1 | 7/2006 | Herz et al. | |
| 2006/0168032 A1 | 7/2006 | Cai et al. | |
| 2006/0184500 A1 | 8/2006 | Najork et al. | |
| 2006/0294155 A1 | 12/2006 | Patterson | |
| 2007/0028266 A1 | 2/2007 | Trajkovic et al. | |
| 2007/0043707 A1 | 2/2007 | Kulkarni et al. | |
| 2007/0129997 A1 | 6/2007 | Davies | |
| 2007/0179943 A1 | 8/2007 | Hegerty et al. | |
| 2007/0198498 A1 | 8/2007 | Loftus et al. | |
| 2008/0027979 A1* | 1/2008 | Chandrasekar et al. | 707/103 R |
| 2008/0082528 A1 | 4/2008 | Bonzi et al. | |
| 2008/0091708 A1 | 4/2008 | Caldwell | |
| 2008/0102799 A1 | 5/2008 | Dholakia et al. | |
| 2008/0104032 A1 | 5/2008 | Sarkar | |
| 2008/0154847 A1 | 6/2008 | Chellapilla et al. | |
| 2008/0163071 A1 | 7/2008 | Abbott et al. | |
| 2008/0168053 A1 | 7/2008 | Garg et al. | |
| 2008/0208852 A1 | 8/2008 | Kuttikkad et al. | |
| 2008/0263022 A1 | 10/2008 | Kostorizos et al. | |
| 2008/0301281 A1 | 12/2008 | Wang et al. | |
| 2009/0006368 A1 | 1/2009 | Mei et al. | |
| 2009/0019062 A1* | 1/2009 | Saba | 707/10 |
| 2009/0106202 A1 | 4/2009 | Mizrahi | |
| 2009/0144654 A1 | 6/2009 | Brouwer et al. | |
| 2009/0157714 A1 | 6/2009 | Stanton et al. | |
| 2009/0198701 A1* | 8/2009 | Haileselassie et al. | 707/10 |
| 2009/0222917 A1 | 9/2009 | Mills et al. | |
| 2009/0234878 A1* | 9/2009 | Herz et al. | 707/102 |
| 2009/0254563 A1* | 10/2009 | Arnold et al. | 707/10 |
| 2009/0282034 A1* | 11/2009 | Goronzy et al. | 707/5 |
| 2010/0023506 A1 | 1/2010 | Sahni et al. | |
| 2010/0082660 A1 | 4/2010 | Muilenburg et al. | |
| 2010/0211568 A1* | 8/2010 | Chu et al. | 707/732 |
| 2010/0293057 A1 | 11/2010 | Haveliwala et al. | |
| 2011/0029515 A1* | 2/2011 | Scholz et al. | 707/732 |
| 2011/0035345 A1 | 2/2011 | Duan et al. | |
| 2011/0087773 A1 | 4/2011 | Ishioka | |
| 2011/0099263 A1* | 4/2011 | Patil et al. | 709/224 |
| 2011/0153638 A1 | 6/2011 | Mclean | |
| 2011/0295612 A1* | 12/2011 | Donneau-Golencer et al. | 705/1.1 |
| 2012/0066212 A1 | 3/2012 | Jennings | |
| 2012/0079385 A1* | 3/2012 | Ellis et al. | 715/719 |
| 2012/0102121 A1* | 4/2012 | Wu et al. | 709/206 |
| 2013/0080526 A1 | 3/2013 | Gill et al. | 709/204 |
| 2013/0218905 A1* | 8/2013 | Sankarasubramaniam et al. | 707/748 |

OTHER PUBLICATIONS

PCT International Search Report and Written Opinion, PCT/US2011/062956, Dec. 1, 2011, 7 Pages.

* cited by examiner

RECOMMENDATIONS BASED ON TOPIC CLUSTERS

CROSS-REFERENCE TO RELATED APPLICATION

This application claims the benefit of U.S. Provisional Application No. 61/418,818 filed Dec. 1, 2010, which is hereby incorporated by reference in its entirety.

BACKGROUND

1. Field of Disclosure

The disclosure generally relates to creating and storing user profiles based on content consumption.

2. Description of the Related Art

Content hosting services generally attempt to present content that is generally of interest to its users. Some content hosting services allow users to create user profiles that indicate demographic information (e.g., gender, age), as well as areas of interests or content topics. The content hosting service then attempts to use such profiles to select content to provide to the users. However, the users may not be able to articulate all their interests while populating their profile. Additionally, users' interests typically change over time and the users may not update their profiles to reflect these changes.

SUMMARY

A user's profile is created based on the user's interaction with content items in a content hosting service. A user's interactions with the content items on the content hosting service are recorded. A user analysis module determines topics associated with the content items with which the user has interacted. The user analysis module then selects the topics for the user's profiles based recorded interactions and the associated topics. A user profile is created which represents the selected topics. In one embodiment, the topics associated with the content items have associated topic strengths and the user analysis module selects the topics for user's profiles based on the topic strengths. In another embodiment, the user's interactions with various content items have associated interaction strengths and the user analysis module selects the topics for user's profiles based on the associated interaction strengths, and stores the topic association strengths for the selected topics in the user profile. In one embodiment, topics in the user profile are mapped to clusters of topics, and the mapped cluster topics replace or accompany the user topics in the user profile. Various user-cluster communities are formed that include users whose profiles have a common topic cluster. Recommendations to these user-cluster communities can be made based on the user interactions of some of the users in a community.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables determination and storage of user profiles that represent, for each user, a set of topics indicative of the user's interests, based on the user's interaction with content items. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
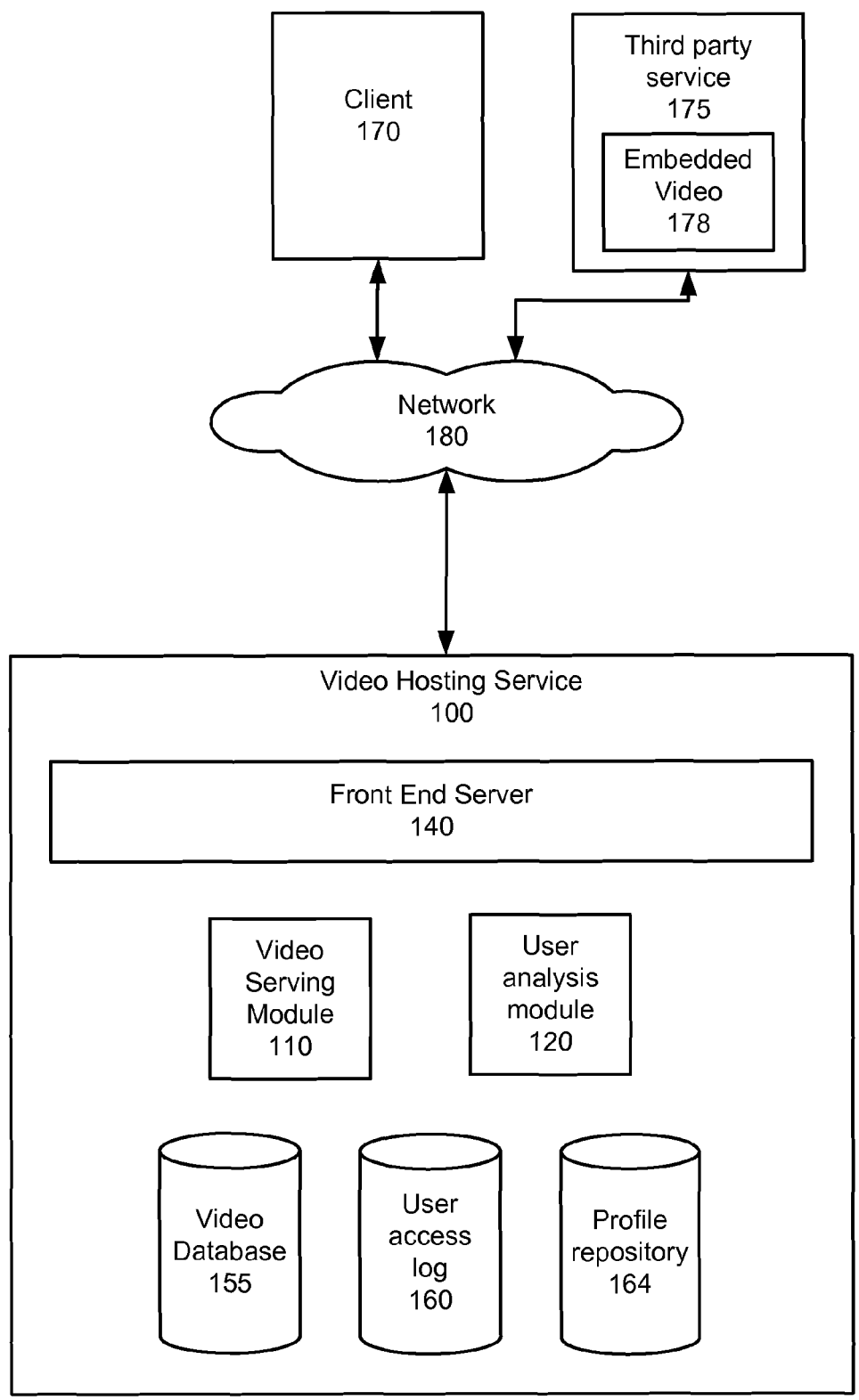
FIG. 1 illustrates a system for determining and storing the users' profile including their areas of interest according to one embodiment.

FIG. 1 illustrates a system for determining and storing user profiles. A video hosting service 100 includes a front end web server 140, a video serving module 110, a video database 155, a user analysis module 120, a user access log 160, a topic repository 164 and a profile repository 166. Video hosting service 100 is connected to a network 180. FIG. 1 also includes a client 170 and third-party service 175 having an embedded video 178.

Many conventional features, such as firewalls, load balancers, application servers, failover servers, network management tools and so forth are not shown so as not to obscure the features of the system. A suitable service for implementation of the system is the YOUTUBE™ service, found at www.youtube.com; other video hosting services are known as well, and can be adapted to operate according to the teaching disclosed here. The term "service" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The servers and modules described herein are implemented as computer programs executing on server-class computer comprising a CPU, memory, network interface, peripheral interfaces, and other well known components. The computers themselves in some embodiments run a conventional proprietary or open-source operating system such as Microsoft Windows, Mac OS, Linux, etc., have generally high performance CPUs, gigabytes or more of memory, and gigabytes, terabytes, or more of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage mediums (e.g., RAM, hard disk, or optical/magnetic media).

A client 170 connect to the front end server 140 via network 180, which is typically the internet, but can also be any network, including but not limited to any combination of a LAN, a MAN, a WAN, a mobile, wired or wireless network, a private network, or a virtual private network. While only a single client 170 is shown, it is understood that very large numbers (e.g., millions) of clients can be supported and can be in communication with the video hosting service 100 at any time. The client 170 may include a variety of different computing devices. Examples of client devices 170 are personal computers, digital assistants, personal digital assistants, cellular phones, mobile phones, smart phones or laptop computers. As will be clear to one of ordinary skill in the art, the present invention is not limited to the devices listed above.

The client includes a browser or a dedicated application that allows client 170 to present content provided on the video hosting service 100. Suitable applications include, for example, Microsoft Internet Explorer, Netscape Navigator, Mozilla Firefox, Apple Safari, and Google Chrome. The browser can also include or a support a plug-in for a video player (e.g., Flash™ from Adobe Systems, Inc.), or any other player adapted for the video file formats used in the video hosting service 100. Alternatively, videos can be accessed by a standalone program separate from the browser.

The digital content items can include, for example, video, audio or a combination of video and audio. Alternatively, a digital content item may be a still image, such as a JPEG or GIF file or a text file. For purposes of convenience and the description of one embodiment, the digital content items will be referred to as a "video," "video files," or "video items," but no limitation on the type of digital content items are indented by this terminology. Other suitable types of digital content items include audio files (e.g. music, podcasts, audio books, and the like), documents, images, multimedia presentations, and so forth.

The video hosting service 100 provides videos that have been uploaded by other users of the video hosting service 100, or may have been provided by the video hosting service operator, or by third parties. Clients 170 can search for videos based on keywords or other metadata. These requests are received as queries by the front end server 140 and provided to the video serving module 110, which is responsible for searching the video database 155 for videos that satisfy the user queries and providing the videos to the users. The video serving module 110 supports searching on any fielded data for a video, including its title, description, metadata, author, category and so forth. Alternatively, users can browse a list of videos based on categories such as most viewed videos, sports, animals, or automobiles. For example, the user may browse a list of videos related to cars and select which videos from the list to view.

Video database 155 stores videos provided to clients 170. Each video in one embodiment has a video identifier (id). Each video file has associated metadata associated that includes video ID, author, title, description, and keywords, additional metadata can be included as available. The metadata also includes one or more topics that are associated with the video. The associated topics may include topics created by a community in a collaborative knowledge base like Freebase. Alternatively, the topics may be selected from the frequently occurring topics occurring in the titles, descriptions, and user comments of the videos, for example the 100,000 most frequently occurring term unigrams or bigrams.

In one embodiment, each topic is associated with a topic strength TS representing the topics' degree of association with the video. The topic strength for a particular topic and video is based on content analysis of the video, users' comments for the video, or other metadata associated with the video. Alternatively, instead of being stored with the metadata of each video, the topics and topic strength information can be stored in a separate database.

In one embodiment, the topic strength for a video is also adjusted based on the usefulness of a topic. The usefulness of a topic is a weight reflecting how useful is a topic to a system in representing the topic's association with the video. For example, the system operator may not prefer topics that represent racy or objectionable content and therefore the usefulness weight for such topics may be a low or a negative value. In another example, the usefulness of a topic is based on the frequency of topic in the corpus.

The user access log 160 stores access data describing the user's access and interactions with videos. The access data indicates whether a user watched an entire video, watched a video for a particular duration, skipped a video, scrolled up or down through a web page including a video, shared a video with other users, added a video to a playlist, flagged a video, blocked a video from a playlist or a collection of videos, favorited a video, gave a video a favorable rating (e.g. liked a video using a FACEBOOK™ account or +1'd a video using a GOOGLE+™ account), gave a video an unfavorable rating (e.g. "thumbs down"). In one embodiment, the user access log 160 or another entity associated with the user access log 160 provides the users with the opportunity to opt-out of having the users' access data collected and/or shared with other modules in the video hosting service 100 or other services.

The profile repository 164 stores the user profiles. A user profile includes a set of topics for a user. This set of topics represents the user's interest and the list may be partly populated by receiving a number of topics from the user. The user profile may include the topics as a list of topics (e.g., as terms or topic identifiers), or as vector (e.g., bit map, or vector of real valued weights). Additionally, the list is populated by the user analysis module 120. The topics stored in a user's profile can be used for various purposes. For example, the topics can be displayed as user's area of interest on the user's home page in a social network or a content hosting network. Additionally, the topics may be used to suggest to the user content, content channels, products, services, additional topics etc. that may be of interest to the user. The suggestions may be provided to the user on the user's home page or another web page like a "browse" page where a user may browse through various topics that may be of interest to the user.

In one embodiment, the topics displayed on the user's home page or browse page are selectable (for e.g. through a hyperlink). A user may select a topic and the selection leads the user to a web page partly or wholly dedicated to the selected topic. The selected topic's web page includes content related to the selected topic, like related multimedia content or textual content. Additionally, the topic's web page may include links to other related topics' web pages. These related topics may be displayed as topics related to the selected topic or recommended topics for a user visiting the selected topic's web page.

Figure 2:
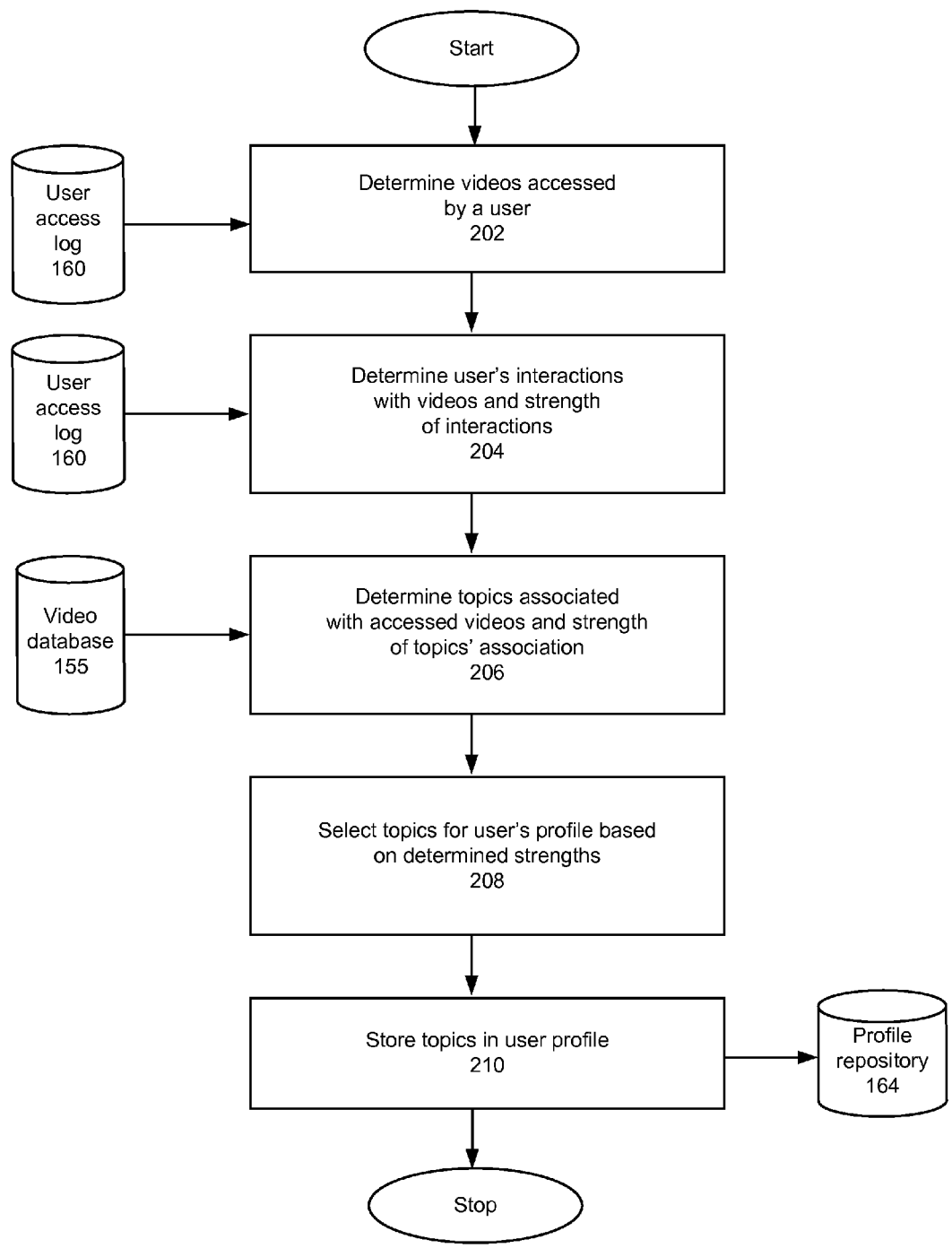
FIG. 2 is a flow diagram illustrating a method for determining and storing the users' profile including their areas of interest according to one embodiment.

The user analysis module 120 determines and stores a user profile based on the videos accessed by the user, and is one means for performing this function. FIG. 2 illustrates method executed by the user analysis module 120 for determining and storing the topics for a user profile. To determine the topics, the user analysis module 120 queries the user access log 160 and determines 202 videos accessed by the user. This set of videos can be all videos accessed by the user, or just those accessed by the user within a certain time period, such as the previous thirty days.

The user analysis module 120 analyzes the user's access data stored in the user access log 160 and determines 204 the user's interactions with the accessed videos. The user analysis module 120 also determines 204 the user's interaction strength for each accessed video based on factors like the type of user's interaction with the accessed video. The user analysis module 120 also queries the video database 155 and determines 206, for each video accessed by the user, the topics associated with the accessed videos and the video's topic strengths indicating the video's degree of association with the topics. Based on the determined interaction strengths and topic strengths, the user analysis module 120 selects 208 and stores 210 topics in the user's profile.

The user analysis module 120 also determines and provides recommendations based on the users' interaction with the videos, and is also one means for performing this function. The recommendations can be recommended videos for the user or recommended topics for the videos. The operation of the user analysis module 120 to provide recommendation is further described below with respect to FIG. 6.

Figure 3:
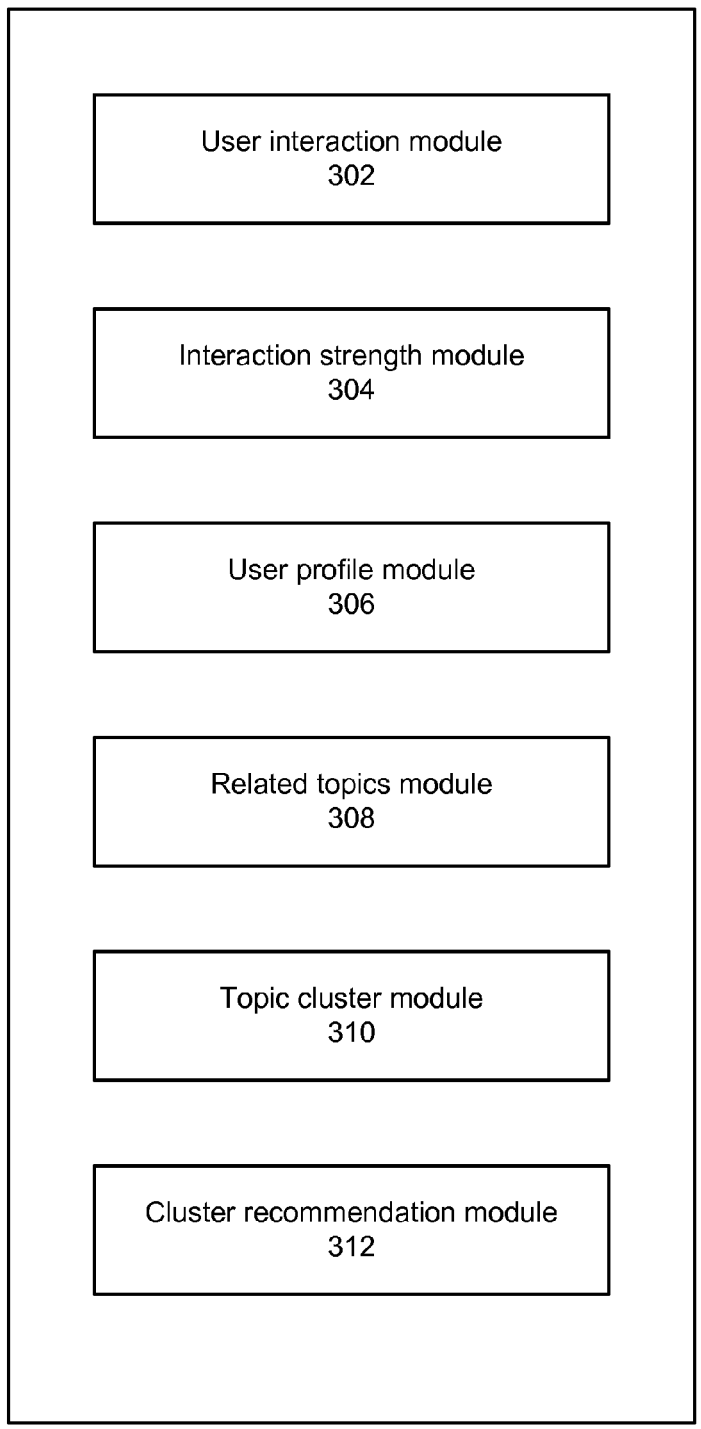
FIG. 3 is a block diagram illustrating the user analysis module that determines and stores the user profiles according to one embodiment.

FIG. 3 is a block diagram illustrating the user analysis module 120 according to one embodiment. The user analysis module 120 comprises a user interaction module 302, an interaction strength module 304, a user profile module 306, a related topics module 308, a topic cluster module 301 and a cluster recommendation module.

The user interaction module 302 receives feedback regarding the users' interactions with videos and stores the received feedback as access data in the user access log 160. A module (not shown) in the client 170 (or the service 175) tracks data about the user's interactions (e.g. pause, rewind, fast forward). Additional user's interactions (e.g. the user requesting a video, rating a video, sharing a video) are tracked by a module (not shown) in the video hosting service 100 or at another service like a social networking service. Regardless of where the data is tracked, the data is transmitted to the user interaction module 302. The user interaction module 302 receives the transmitted data and stores the received data in the user access log 160 as access data. Examples of access data stored in access log 160 are described above. The user interaction module 302 repeatedly receives feedback regarding the user's interactions with various videos and updates the access data for the user based on the received feedback.

The interaction strength module 304 analyzes the access data for a user and determines an interaction strength $IS_i$ indicating a user's degree of association with a particular video $v_i$. To determine the IS value, the interaction strength module 304 assigns different weights to different types of user's interactions with the video. For example, a user starting a video may be assigned a weight of 0.5, a user watching at least 80% of the video may be assigned a weight of 0.75, a user giving a favorable rating for the video may be assigned a weight of 1.5, a user favoriting a video may be assigned a weight of 2.0, and a user subscribing to a channel of videos associated with the watched video or with the user who uploaded the watched video may be assigned a weight of 5.0. The interaction strength module 304 assigns greater weight to the user's interactions indicating a greater involvement with a video. For example, the interaction strength module 304 assigns a greater weight to a user adding a video to a playlist, or sharing a video with others, than to the user watching the video. Additionally, the interaction strength module 304 adjusts the weight for a particular interaction based on the frequency or duration of the interaction. For example, the interaction strength module 304 assign a greater weight to a user's view of a particular video if the user has viewed the video a number of times instead of just once or for a ten minute duration instead of thirty seconds. In one embodiment, the interaction strength module 304 normalizes the adjusted weights based on the total number of videos the user has interacted with, the total number of times the user has interacted with the videos, or the total amount of time the user has spent interacting with the videos.

The interaction strength module 304 assigns negative or relatively low weights to certain interactions indicating the user's lack of interest in a particular video. For example, skipping a presented video, flagging a video, or blocking a video from a playlist may be assigned a negative weight.

In one embodiment, the interaction strength module 304 discounts the weight based on their age. For example, the interaction strength module 304 exponentially decays the weight associated with a user interaction based on the amount of time elapsed since the user interaction occurred. Accordingly, a user interaction that occurred recently is assigned a higher weight than a user interaction that occurred at an earlier time.

After assigning and adjusting weights for the user's interactions with a particular video, the interaction strength module 304 determines and stores an interaction strength IS indicating the strength of the user's interactions or association with the video. The interaction strength is based on the assigned and adjusted weights. For example, the interaction strength is a sum or product of the assigned and adjusted weights.

As described above, the user analysis module 120 determines for a user, the videos $v_i$ the user has interacted with (from the user access log 160) and the user's interaction strength $IS_i$ for each of these videos (determined by the interaction strength module 304). Also, as described above, the user analysis module 120 determines for each of these videos $v_i$, topics t associated with the video (from the video database 155) and, for each of the associated topic $t_k$, a topic strength $TS_k$ indicating the topic's degree of association with the video (from the video database 155).

Based on this information, the user profile module 306 determines a set T of topics for a user's profile. To determine the topics T for a user profile, the user profile module 306 sorts the videos $v_i$ the user interacted with based on the topics $t_k$ associated with the videos. The sort results in sets $S=\{s_1, s_2, s_3 \ldots s_j\}$ of topics such that each set $s_j$ includes a topic $t_k$ and its associated user's videos $v_{i,k}$. The user profile module 306 selects a number of the topic sets s, where each selected set has a minimum number of videos, e.g., each selected topic set has at least 20 videos. The topics $t_k$ of the selected sets s form the set T topics for the user's profile.

Alternatively, the user profile module 306 determines the set T of topics for a user profile based on a topic association strength TAS determined for each set s, where $TAS_j$ indicates the degree of association between set $s_j$'s topics t and the user. To determine the topic association strength $TAS_j$ for a particular set $s_j$ of topics $t_k$, the user profile module 306 combines the topic strengths $TS_k$ of the set's topics $t_k$ for each of the videos $v_i$ in the set $s_j$. Combining the topic strengths TSs may occur by adding, averaging, or applying another arithmetic or statistical function to the topic strengths TSs. After determining the topic association strength $TAS_j$ for each set $s_j$ in S, the user profile module 306 selects a number of these sets based on the sets topic association strengths $TAS_j$. For example, the user association module 306 may select fifty sets s with fifty highest topic association strengths TAS. The topics $t_k$ of the selected sets s form the set T topics for the user's profile.

The user profile module 306 also stores in the user's profile the topic association strengths TAS associated with the stored topics. The user profile module 306 can be configured to periodically updates the stored topics in a user's profile using the process described above, based on the videos that the user interacted with since a prior update.

Additionally, in one embodiment, the user profile module 306 receives topics that are related with the topics stored in a user profile and stores the related topics in the user profile. The user profile module 306 receives the related topics from the related topics module 308. Related topics module 308 accesses the topics in a user's profile and determines additional topics related to the profile's topics.

There are several different ways that the related topics module 308 can determine related topics. These include a demographic approach, a topic co-occurrence approach, and a combined demographic and topic co-occurrence approach. Additional approaches to determine related topics would be apparent to one of ordinary skill in the art in light of the disclosure herein. For example, related topics may also be determined based on topics' relationships specified in a knowledgebase like Freebase.

Related Topics Based on Demographics

In one embodiment, related topics module 308 determines related topics based on the popularity of various topics in each of a number of demographic groups. In this embodiment, the related topics module 308 organizes the user profiles in the profile corpus based on one or more demographic category, such as gender and age group. For example, the related topics module 308 can organize the user profiles into twelve demographic groups $D_z$ of profiles based on the user's gender (male, female) and age group (e.g., 13-17, 18-24, 25-34, 35-44, 45-54; 55+). The related topics module 308 then determines, for each demographic group $D_z$ of user profiles, a number of most frequently occurring topics t (e.g., the top 50 most frequently occurring topics); this forms the related topic set $R_z$ for the demographic group $D_z$. Then for a given demographic group $D_z$, the related topics module 308 adds the related topics $R_z$ to each user profile in $D_z$. If a topic t in $R_z$ is already present in the user profile, then it can be handled either by skipping it, or by increasing its topic association strength TAS.

Related Topics Based on Topic Co-Occurrence

In another embodiment, the related topics module 308 uses the co-occurrence of topics in the user profiles to determine which topics are related to each other. To determine the related topics, the related topics module 308 initially determines, across a collection of user profiles (e.g., all user profiles in the system), pairs of topics $(t_i, t_j)$ that co-occur in at least some of the user profiles in the collection, and from there determines a measure of co-occurrence for each topic pair. The determination of these co-occurring topics is described in regards to FIG. 5 below. The related topics module 308 then determines for each topic $t_k$ in the corpus, the most closely related topics $t_l$ based on the co-occurrence measure. Next, given a user profile with topics $t_j$, the related topics module 308 adds to the user profile for each topic $t_j$ the most closely related topics $t_l$.

Figure 5:
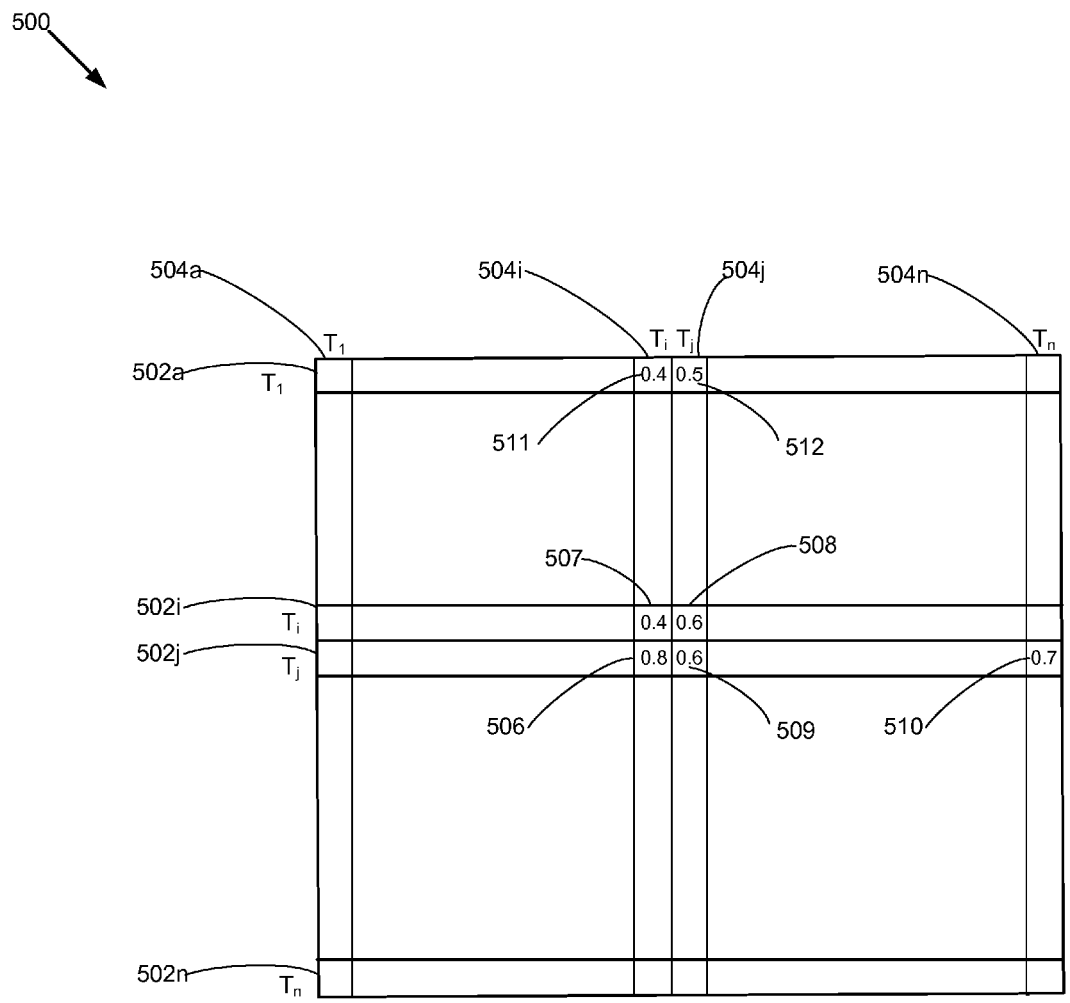
FIG. 5 illustrates a co-occurrence matrix that stores co-occurrence strengths indicating the measure of co-occurrence of a first topic with another topic according to one embodiment.

FIG. 5 illustrates a co-occurrence matrix 500 that stores co-occurrence strengths $CS_{i,j}$ indicating the measure of co-occurrence of a topic $t_i$ with another topic $t_j$. One of ordinary skill in the art will understand that the illustrated co-occurrence matrix 500 is simply a graphical representation of co-occurrence strengths CSs used to aid the description of the related topics module 308, and that the matrix 500 may be stored in various data structures like arrays, lists etc. Given n topics t, the co-occurrence matrix 500 is an nXn matrix. Each row 502a-n represents a topic $t_i$ and each column 504a-n represents a topic $t_j$. Each cell, like cell 508 represents the co-occurrence strength $CS_{i,j}$ of for the pair of topics $t_i$ and $t_j$.

The co-occurrence strength $CS_{i,j}$ for the pair of topics $(t_i, t_j)$ may be determined as follows. As noted above, each topic $t_i$ in user profile has a topic association strength $TAS_i$. Thus, for a pair of topics $t_i$ and $t_j$ co-occurring in a given user profile, the related topics module 308 computes a profile co-occurrence strength $PCS_{i,j}$ based on the topic association strengths $TAS_i$ and $TAS_j$. The profile co-occurrence strength $PCS_{i,j}$ may be a product, sum, average, or another arithmetic or statistical function of the pair's topic association strengths $TAS_i$ and $TAS_j$. The co-occurrence strength $CS_{i,j}$ is then the combined $PCS_{i,j}$ summed across all user profiles in which topics $t_i$ and $t_j$ co-occur. Each $PCS_{i,j}$ is then normalized by the frequency of topic $t_i$ in the profile corpus. In other embodiments, combining may include averaging, adding, or performing another arithmetic or statistical function on the profile co-occurrence strengths PCS.

An example illustrated in FIG. 5 assists in describing the method for computing the co-occurrence strengths (CSs). In FIG. 5, cell 508 includes the co-occurrence strength (CS) for topic $t_i$ (topic for intersecting row 502i) co-occurring with topic $t_j$ (topic for intersecting column 504j) in the profile corpus used to select topics for the co-occurrence matrix 500. This co-occurrence strength (CS) is a normalized sum of topic association strengths (TASs) of $t_i$ and $t_j$ for corpus' profiles that include both these topics. The sum of the topic association strengths (TASs) has been normalized by the frequency of $t_i$'s appearance in corpus' profiles. Similarly, cell 506 includes the co-occurrence strength (CS) for topic $t_j$ co-occurring with topic $t_i$. This co-occurrence strength (CS) is also a normalized sum of topic association strengths (TASs) of $t_i$ and $t_j$, but this sum has been normalized by the frequency of $t_j$'s, not $t_i$'s, appearance in the corpus' profiles.

After populating the co-occurrence matrix 500, the related topics module 308 identifies for each topic $t_i$ (by row) a number of cells with the highest co-occurrence strengths CSs (e.g., 50 highest values), or the cells with co-occurrence strengths CS beyond a threshold value (e.g., $CS_{i,j}$ >75% of maximum $CS_{i,j}$). These cells represent the set of topics $R_i$ that are determined to be related to topic $t_i$.

The example illustrated in FIG. 5 further illustrates the method employed by the related topics module 308 to select related topics for topic $T_j$. In FIG. 5, assume that cells 508, 510 include the highest co-occurrence strengths $CS_{i,j}$ for topic $t_j$ (represented by row 502j). The related topics module 308 identifies these cells 506, 508 as the cells with the highest co-occurrence strengths $CS_{i,j}$ and thus identifies topics $t_i$ and $t_n$ (the topics of the intersecting columns 504i, 504n for cells 506, 508) as topics related to topic $t_j$.

Finally, given a user profile of topics t, for each topic $t_i$ therein the related profile module 308 adds the related topics $R_j$ to the user profile. If a topic t in $R_i$ is already present in the user profile, then it can be handled either by skipping it, or by increasing its topic association strength TAS.

Related Topics Based on Demographics and Co-Occurrence

In one embodiment, the related topics module 308 determines related topics for a selected user from a profile corpus of users that are in same demographic group as the selected user. To determine these related topics, the related topics module 308 constructs for each demographic group $D_z$ a co-occurrence matrix 500 from a set of user profiles belonging to that group. Then for each demographic group $D_z$, the related topics module 308 determines the related topics $R_{z,i}$ for each topic$_i$ in that that group's co-occurrence matrix.

User Selected Topics

Figure 4:
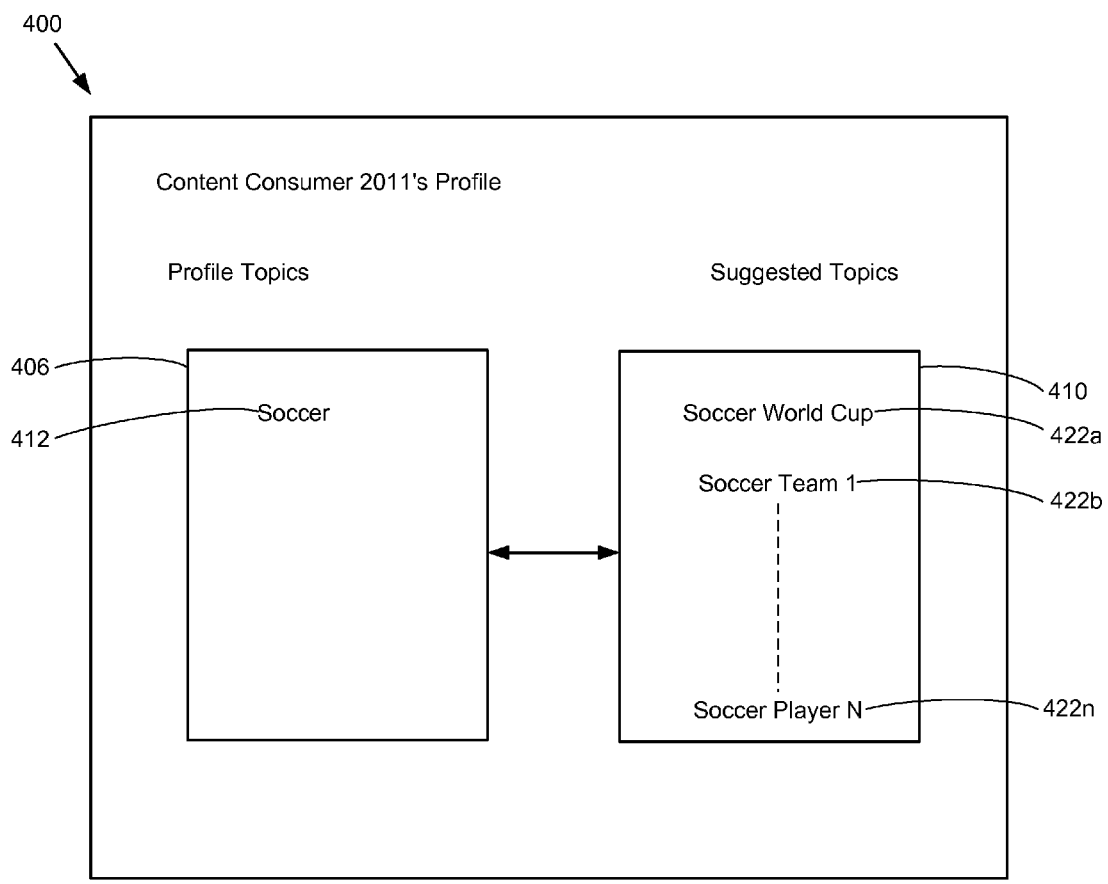
FIG. 4 is a screen illustrating an interface for receiving users' areas of interests for storage in their profiles according to one embodiment.

In the foregoing embodiments, the related topics module 308 automatically adds related topics to each user's profile. Alternatively, the related topics module 308 can be configured to enable users to selectively add related topics to their individual user profiles. In one embodiment, the users may add topics, including related topics, to their own profiles through an interface such as the one illustrated in FIG. 4. The interface in FIG. 4 includes a profile topics column 406 and a related topics column 410. The profile topics column 406 includes the topics 412 associated with a user's profile based on the analysis of the user's interactions with videos. In response to a user selecting one or more of the topics 412 in the profile topics column 406, the related topics column 410 is updated to include topics 422$a$-$n$ related to the selected topics 412. The related topics 422$a$-$n$ are determined by the related topics module 308 and presented to the user in the related topics column 410. The user may select one or more related topics 422$a$-$n$, and in response to such selection, these topics are added to the user's profiles. In one embodiment, the user profile module 306 also determines and stores with the additional topics their topic association strengths TAS.

Recommendations Based on Topic Clusters

Figure 6:
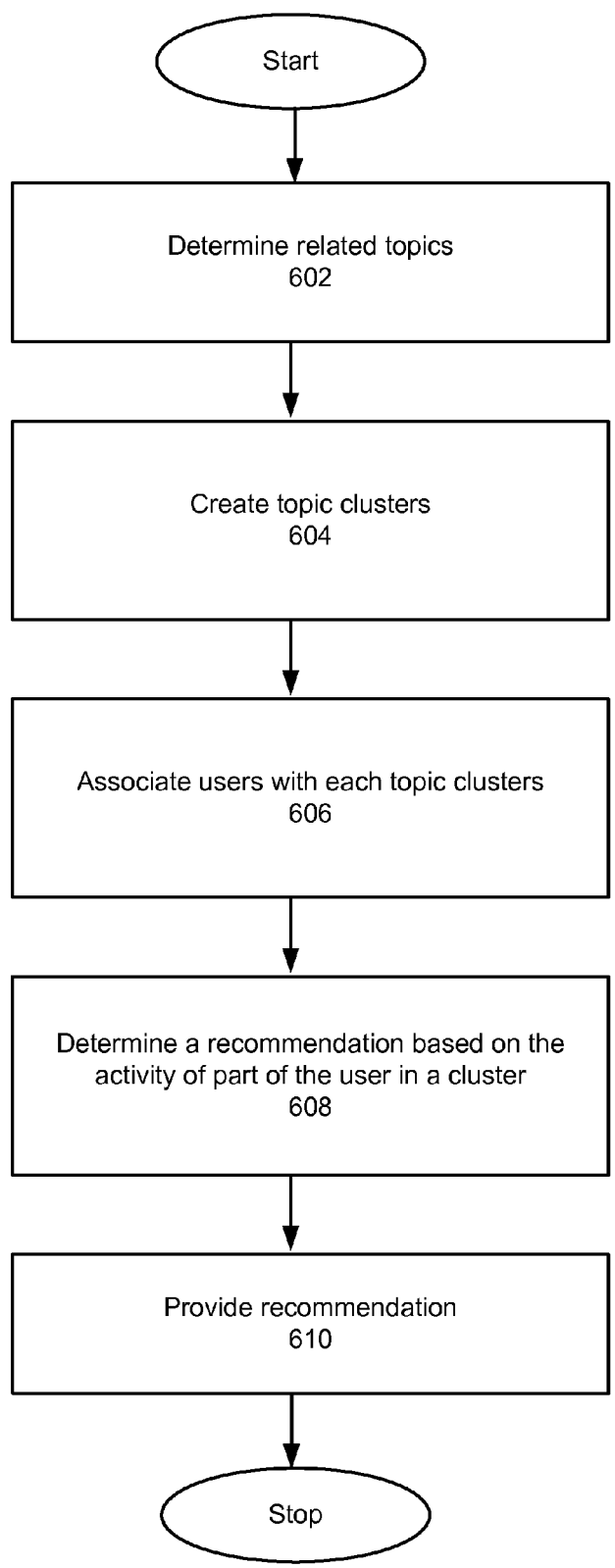
FIG. 6 illustrates a method for providing recommendations based on the users' interactions according to one embodiment.

FIG. 6 illustrates a method executed by the user analysis module 120 for providing recommendations based on the user's interactions. The user analysis module 120 determines 602 related topics based on the user profiles, using any of the previously described methods (demographic, co-occurrence, or demographic co-occurrence).

After determining the related topics, the user analysis module 120 creates 604 topic clusters with related topics. The creation of topic clusters is further described in the next section, Creating Topic Clusters.

Next, the user analysis module 120 associates 606 various users to the created topic clusters based on the topics in the topic clusters and the user profiles. The association of users to topic clusters is further described below under the heading Associating Users with Clusters.

The user analysis module 120 then monitors the activity of users associated with a cluster and determines 608 a recommendation, like a video for the associated users, based on the monitored activity. The user analysis module 120 provides 610 the recommendation for display to the users. The manner of making the recommendations is further described below under the heading Recommendations Based on Clusters.

Creating Topic Clusters

In one embodiment, the user profiles module 306 stores topic clusters, in addition to, or instead of, the topics in the user profiles. The topic clusters include a set of related topics. The user profiles module 306 receives the topic clusters from the topic clusters module 310.

The topic cluster module 310 creates topics cluster $TC_i$ including topics occurring in user profiles. The topic cluster module 310 may create topics clusters based on clustering algorithms like hierarchical agglomerative clustering (HAC), probabilistic models like Latent Dirichlet Allocation (LDA), or vector models, such as k-means (using rows in the co-occurrence matrix as topic vectors). In one embodiment, the topic cluster module 310 clusters topics from the co-occurrence matrix 500 using HAC. Again, the co-occurrence matrix 500 stores co-occurrence strengths $CS_{i,j}$ for pairs of topics ($t_i$, $t_j$) that co-occur in at least some of the user profiles in a collection of user profiles. To create topics clusters from the co-occurrence matrix 500, the topic cluster module 310 identifies the cell in the co-occurrence matrix 500 with the highest co-occurrence strength $CS_{i,j}$. After identifying the cell with the highest co-occurrence strength $CS_{i,j}$, the topic cluster module 310 clusters the topics ($t_i$, $t_j$) associated with the identified strength $CS_{i,j}$.

To cluster the associated topics, the topic cluster module 310 determines the co-occurring topics ($t_i$, $t_j$) associated with the identified cell and the rows and columns associated with the determined co-occurring topics. Assume for illustration purposes that the topic cluster module 310 identifies cell 506 in co-occurrence matrix 500 as the cell with the highest co-occurrence strength $CS_{i,j}$. The topic cluster module 310 determines that co-occurring topics $t_i$ and $t_j$ are associated with the identified cell 506 and combines the two topics into a cluster.

To combine the two topics ($t_i$, $t_j$), the topic cluster module 310 combines cells in one row with the adjacent cells in the other to get a combined row. For example, to combine rows 502$i$ and 502$j$, the topic cluster module 310 combines cell 506 with cell 507, cell 508 with cell 509, and so on to get a combined row 502$i$-$j$. Similarly, the topic cluster module 310 combines cells in one column with the adjacent cells in the other to get a combined column. To combine two cells, the topic cluster module 310 combines the co-occurrence strengths $CS_{i,j}$ of the two cells into cluster co-occurrence strengths $CCS_{i-j,k}$. The cluster co-occurrence strengths $CCS_{i-j,k}$ indicate the measure of co-occurrence of the cluster (including topics $t_i$ and $t_j$) with another topic $t_k$. The topic cluster module 310 combines the co-occurrence strengths $CS_{i,j}$ into cluster co-occurrence strength $CCS_{i-j,k}$ by adding multiplying, averaging, or applying another arithmetic or statistical function on the co-occurrence strengths $CS_{i,j}$. In one embodiment, the topic cluster module 310 also normalizes the cluster co-occurrence strength $CCS_{i-j,k}$ based on a factor like the frequency of the combined topics in the user profile collection.

The combination of the cells in the identified rows and columns leads to a new co-occurrence matrix (not shown) that includes n−1 topics wherein one of these topics is a cluster c including the combined topics $t_i$ and $t_j$. The topic cluster module 310 then repeats the step of identifying the cell in the new co-occurrence matrix with the highest co-occurrence strength $CS_{i,j}$ and clustering the topics or clusters associated with the identified cell. The identified cell may be associated with two topics, a topic and an already formed cluster, or two clusters. The topic cluster module 310 keeps repeating this process of clustering until a termination condition is reached. The termination condition can be a threshold number of clusters of a threshold size (in number of topics or number of videos), or the resulting cluster co-occurrence strength $CCSs_{i-j,k}$ for the updated cluster does not fall below a threshold. After the termination condition is reached, the topic cluster module 310 stores the clusters with their combined topics and cluster co-occurrence strengths $CCSs_{i-j,k}$.

Associating Users with Clusters

As stated above, the user profile module 306 stores topic clusters instead of, or in addition to, topics in the user profiles. To determine topic clusters c for a user's profile, the user profile module 306 identifies, for each topic in the user profile, the cluster c to which that topic belongs, adds that cluster c to a list of clusters for the user profile. The result is a user-cluster profile C comprising a plurality of clusters c.

The user profile module 306 then determines a user cluster strength $UCS_c$ for each identified cluster c in the user-cluster profile C indicating the degree of association of the identified cluster c with the user. The user cluster strength $UCS_c$ for an identified cluster c is the sum of the topic association strengths $TAS_i$ for those topics of the user profile that are in that cluster c. In one embodiment, the user cluster strength $UCS_c$ for an identified cluster c is the weighted sum of the topic association strengths $TAS_i$ for those topics of the user profile that are in that cluster c. The weight for each of the topic association strengths is the cluster co-occurrence strength $CCS_i$ for the identified cluster. In other embodiments, the user profile module 306 performs other mathematical or statistical functions on the topic association strengths $TAS_i$, and cluster co-occurrence strength $CCS_{i,}$ to achieve the user cluster strength $UCS_c$. The result of this operation is the representation of the user cluster profile C comprising a list (or vector) of cluster strengths.

Optionally, the user profile module 306 then selects a threshold number of clusters with highest user cluster strengths, e.g., the 20 clusters c with the highest UCS values. In another embodiment, the user profile module 306 selects all clusters c with the user cluster strength UCS beyond a threshold value. The user profile module 306 stores the selected clusters as clusters for the user-cluster profile.

Recommendations Based on Clusters

The cluster recommendation module 312 determines a recommendation of a video or a topic for a user, based on the user-cluster profile, and the interactions of other users with the videos.

To determine the recommendation of a video to a given user, the cluster recommendation module 312 selects one or more of the clusters identified in the user-cluster profile of the user. Then the module 312 analyzes the access data for the other users who also have the identified cluster(s) in their respective user-cluster profiles. These users are called a user-cluster community. In this fashion, a user is a member of a plurality of user-cluster communities, each community corresponding to one of the clusters in the user's user-cluster profile.

Given the user-cluster community, the module 312 determines which video(s) are currently popular with this set of users, for example in terms of user interactions, such as number of views, user ratings, user comments, or other measures of popularity. The module 312 then selects one of more of the most popular videos as recommended videos for the given user. For example, if a threshold number of these users have interacted with a particular video, the cluster recommendation module 312 selects the video as a recommendation. If the given user has already viewed a recommended video, it can be removed from the recommendations, or demoted in the recommendation list.

The module 312 can also make recommendations for topics, following a similar process. Here, the module 312 determines which topics are currently popular with the user-cluster community, rather than which specific videos are popular. Here, popularity of a topic is based on the aggregated interaction measure for the videos associated with the topic and viewed by users in the particular user-cluster community. The module 312 can then select one or more topics based on their aggregated interaction measures. For example, if a threshold number of selected users have interacted with videos that have a particular topic, the cluster recommendation module 312 selects the particular topic.

From the selected topics, the module 312 then selects videos therein, based on factors such as popularity in the user-cluster community, recency, topic strength, and so forth. For example, if a threshold number of users in the user-cluster community have interacted with a particular video, the cluster recommendation module 312 recommends that video to the user.

In another embodiment, user communities are created by clustering the user-cluster profiles of a population of users. Here, the user-cluster profiles are form a sparse vector ("user cluster vector"), including for each cluster c the $UCS_c$ as described above, and a zero value for each cluster that does not have one of its topics in the user profile. These user-cluster vectors can then be again clustered using k-means or other vector clustering methods, to form a number of user communities. Each user is then associated with the user communities containing the user's user-cluster vector. From there, recommendations may be made as above, using the user community as the population for identifying popular videos or topics.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer.

Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for developing a profile of a user including topic clusters, the method comprising:
   storing, by a computer, a plurality of topic clusters, the plurality of topic clusters including a set of related topics;
   retrieving a profile of a user, the profile including a plurality of topics indicating interests of the user;
   identifying, from the plurality of topic clusters, a topic cluster including a topic from the plurality of topics included in the profile of the user;
   adding the identified topic cluster to a list of topic clusters for the profile of the user;
   identifying a plurality of users, each of the plurality of users associated with a profile that includes the identified topic cluster added to the list of topic clusters for the profile of the user;
   identifying a plurality of videos interacted with by the plurality of users;
   selecting a video from the plurality of videos to recommend to the user based on interactions of the plurality of users with the plurality of videos; and
   recommending the selected video to the user.

2. The method of claim 1, further comprising:
   generating the plurality of topic clusters based on a co-occurrence matrix, the co-occurrence matrix storing co-occurrence strengths for pairs of topics.

3. The method of claim 2, wherein generating one of the plurality of topic clusters comprises identifying a cell in the co-occurrence matrix with a highest co-occurrence strength as a first topic in the one of plurality of topic clusters and adding topics associated with the identified cell to the one of the plurality of topic clusters.

4. The method of claim 1, wherein identifying the topic cluster comprises identifying the topic cluster based on topic association strengths of the topics in the topic cluster.

5. The method of claim 4, wherein a topic association strength for a topic in the topic cluster indicates a degree of association between the user and the topic.

6. The method of claim 1, wherein the video is selected based on a number of the plurality of users who have watched the video exceeding a threshold.

7. The method of claim 1, further comprising:
   selecting a topic for recommendation to the user based on an aggregated interaction measure for videos associated with the topic by the plurality of users.

8. The method of claim 1, wherein the profile of the user includes a user cluster strength for each of the topic clusters in the list of topic clusters for the profile of the user, the user cluster strength indicating the degree of association of the cluster with the user.

9. A computer system for developing a profile of a user including topic clusters, comprising:
   a non-transitory computer-readable storage medium storing executable computer program instructions comprising instructions for:
      storing a plurality of topic clusters, the plurality of topic clusters including a set of related topics;
      retrieving a profile of a user, the profile including a plurality of topics indicating interests of the user;
      identifying, from the plurality of topic clusters, a topic cluster including a topic from the plurality of topics included in the profile of the user;
      adding the identified topic cluster to a list of topic clusters for the profile of the user;
      identifying a plurality of users, each of the plurality of users associated with a profile that includes the identified topic cluster added to the list of topic clusters for the profile of the user;
      identifying a plurality of videos interacted with by the plurality of users;
      selecting a video from the plurality of videos to recommend to the user based on interactions of the plurality of users with the plurality of videos; and
      recommending the selected video to the user;
   and
   a processor for executing the computer program instructions.

10. The system of claim 9 further comprising:
    generating the plurality of topic clusters based on a co-occurrence matrix, the co-occurrence matrix storing co-occurrence strengths for pairs of topics.

11. The system of claim 10, wherein generating one of the plurality of topic clusters comprises identifying a cell in the co-occurrence matrix with a highest co-occurrence strength as a first topic in the one of plurality of topic clusters and adding topics associated with the identified cell to the one of the plurality of topic clusters.

12. The system of claim 9, wherein identifying 11 topic cluster comprises identifying the topic cluster based on topic association strengths of the topics in the topic cluster.

13. The system of claim 12, wherein topic association strength for a topic in the topic cluster indicates a degree of association between the user and the topic.

14. The system of claim 9, wherein the video is selected based on a number of the plurality of users that have watched the video exceeding a threshold.

15. The system of claim 9, further comprising instructions for:

selecting a topic for recommendation to the user based on an aggregated interaction measure for videos associated with the topic by the plurality of users.

16. The system of claim 9, wherein the profile of the user includes a user cluster strength for each of the topic clusters in the list of topic clusters for the profile of the user, the user cluster strength indicating the degree of association of the cluster with the user.

* * * * *

UNITED STATES PATENT AND TRADEMARK OFFICE
CERTIFICATE OF CORRECTION

| | | |
|---|---|---|
| PATENT NO. | : 8,589,434 B2 | Page 1 of 1 |
| APPLICATION NO. | : 13/309481 | |
| DATED | : November 19, 2013 | |
| INVENTOR(S) | : Benjamin Liebald et al. | |

It is certified that error appears in the above-identified patent and that said Letters Patent is hereby corrected as shown below:

On the Title Page

In the Abstract Item (57) last line delete "user'" and insert --user's--.

Signed and Sealed this
Twenty-first Day of October, 2014

Michelle K. Lee
*Deputy Director of the United States Patent and Trademark Office*